3,767,656
s-TRIAZINES
Julius Diamond, Lafayette Hill, and George H. Douglas, Paoli, Pa., assignors to William H. Rorer, Inc., Fort Washington, Pa.
No Drawing. Filed Oct. 14, 1971, Ser. No. 189,191
Int. Cl. C07d 55/20
U.S. Cl. 260—249.9        49 Claims

ABSTRACT OF THE DISCLOSURE

Novel 4-anilino-2-amino-1,3,5-triazines, processes for preparing the same and their method of treatment of hypertension as medicinal agents are described. The compounds of this invention possess utility as diuretics and treatment of hypertension and related pathological disorders. They are also useful in the treating of hyperacidity and ulceration.

SUMMARY OF THE INVENTION

This invention describes novel 4-anilino-2-amino-1,3,5-triazines, processes for preparing the same and their method of treatment as medicinal agents. The 4-anilino-2-amino-1,3,5-triazines have utility as diuretic agents and for the treatment of hypertension and related pathological disorders. Further, the disclosed 4-anilino-2-amino-1,3,5-triazines of this invention are useful in treating gastrointestinal hyperacidity and ulceration. When the compounds of this invention are administered to mammals they afford significant relief from the above conditions.

BACKGROUND OF THE INVENTION

The pharmaceutical compositions which have been used as diuretics have included such as the organic mercurials and the chlorothiazides. It has been found that the organic mercurials are often toxic and thereby produce many unwanted reactions. The chlorothiazides, on the other hand, often result in electrolyte imbalance and hyperurecemia.

The pharmaceutical compositions which have been used as antisecretory and spasmolytic agents have been such as atropine, homatropine, propantheline bromide, dicyclomine hydrochloride and other compounds which are structurally dissimilar to the triazines of this invention. Due to the anti-cholinergic properties of these known compounds, they produce undesirable side effects such as mydriasis, xerostomia, cyclopegia and other unwanted effects.

We have unexpectedly found that the 4-anilino-2-amino-1,3,5-triazine compounds have valuable pharmacological properties.

We have found that the 4-anilino-2-amino-1,3,5-triazines of this invention possess useful diuretic properties.

We have also found that the 4-anilino-2-amino-1,3,5-triazines are useful in the treatment of hypertension and related pathological disorders.

We have also found that these triazines are substantially void of the electrolyte imbalance and hyperurecemia which often accompanies diuretic agents.

We have further found 4-anilino-2-amino triazines which possess useful gastric, anti-secretory, spasmolytic and anti-ulcerogenic properties.

We have again found that these 4-anilino-2-amino-1,3,5-triazine compounds are novel and conveniently synthesized.

DESCRIPTION AND PREFERRED EMBODIMENT

This invention comprises a class of novel chemical compounds which contain an anilino radical which is attached to the 4-position of a 2-amino-1,3,5-triazine ring. More specifically, this invention describes a novel class of chemical compounds which can be described by structural Formula 1:

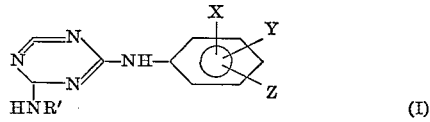

where:

X, Y and Z may be substituted at any position of the ring and

X is hydrogen, fluoro, chloro, bromo or iodo or haloloweralkyl;

Y is hydrogen, loweralkyl, halo, nitro, amino, loweracylamino, mono- & diloweralkylamino, haloloweralkyl, haloloweralkoxy, loweralkoxy, hydroxy, cyano or loweralkylsulfonyl;

Z is haloloweralkoxy, diloweralkylsulfonamido, haloloweracyl, haloloweralkylsulfonyl, halodiloweralkysulfonamido, cyano (provided at least one of X, Y and R' is other than hydrogen), haloloweralkyl (provided at least one of X, Y and R' is other than hydrogen), fluoro (provided at least one of X, Y and R' is other than hydrogen), iodo (provided at least one of X, Y and R' is other than hydrogen), bromo (provided at least one of X, Y and R' is other than hydrogen and when Z is 2-bromo then X is other than 4-chloro or 4-bromo when Y and R' are hydrogen) or chloro (provided X or R' is other than hydrogen and when Z is 2- or 3-chloro then X is other than 4- or 5-chloro or 4-bromo when Y is hydrogen; and R' is hydrogen, loweralkyl, loweralkenyl, cycloloweralkyl or arloweralkyl;

and the non-toxic acid addition salts thereof.

The more preferred compounds of structural Formula I are described where:

X is hydrogen, flouro, chloro or bromo;

Y is hydrogen, fluoro, chloro, bromo, haloloweralkyl or nitro;

Z is haloloweralkyl (provided at least one of X and Y are other than hydrogen), fluoro (provided at least one of X and Y are other than hydrogen), bromo (provided at least one of X, Y and R' is other than hydrogen and when Z is 2-bromo then X is other than 4-chloro or 4-bromo when Y and R' are hydrogen) or chloro (provided X or R' is other than hydrogen and when Z is 2- or 3-chloro then X is other than 4- or 5-chloro or 4-bromo when Y is hydrogen); and R' is hydrogen.

The most preferred compounds of structural Formula I are described where:

X is hydrogen or chloro;

Y is hydrogen, fluoro, chloro or bromo;

Z is trifluoromethyl (provided at least one of X and Y are other than hydrogen, fluoro (provided at least one of X and Y are other than hydrogen), bromo (provided at least one of X, Y and R' is other than hydrogen and when Z is 2-bromo then X is other than 4-chloro or 4-bromo when Y and R' are hydrogen) or chloro (provided X or R' is other than hydrogen and when Z is 2- or 3-chloro then X is other than 4- or 5-chloro or 4-bromo when Y is hydrogen); and R' is hydrogen.

In the descriptive portions of this invention, the following definitions apply:

The term "loweralkyl" refers to an alkyl hydrocarbon group containing from 1 to about 8 carbon atoms which may be straight chained or branched.

The term "loweracyl" radical may be any organic radical derived from an organic acid by the removal of its hydroxyl group such as acetyl, propionyl, benzoyl, etc. Such radical would contain up to about 8 carbon atoms.

The "loweralkoxy" radical signifies an alkoxy group containing from 1 to about 6 carbon atoms which may be straight chained or branched.

The term "loweralkenyl" refers to an alkenyl hydrocarbon group containing from 2 to about 8 carbon atoms which may be straight chained or branched.

The term "ar" preferably refers to phenyl or substituted phenyl where the substituents are loweralkyl or lower alkoxy.

It is well known in the pharmacological arts that nontoxic acid addition salts of pharmacologically active amine compounds do not differ in activities from their free base. The salts merely provide a convenient solubility factor. The amines of this invention may be readily converted to their non-toxic acid addition salts by customary methods in the art. The non-toxic salts of this invention are those salts the acid component of which is pharmacologically acceptable in the intended dosages; such salts would include those prepared from inorganic acids, organic acids, higher fatty acids, high molecular weight acids, etc., and include such as:

hydrochloric acid,
hydrobromic acid,
sulfuric acid,
nitric acid,
phosphoric acid,
methane sulfonic acid,
benzene sulfonic acid,
acetic acid,
propionic acid,
malic acid,
succinic acid,
glycolic acid,
lactic acid,
salicylic acid,
benzoic acid,
nicotinic acid,
phthalic acid,
stearic acid,
oleic acid,
abietic acid, etc.

Representative compounds of this invention include 2-amino-4-(p-trifluoromethoxyanilino)-1,3,5-triazine
2-amino-4-(p-methylsulfonylanilino)-1,3,5-triazine
2-amino-4-(p-dimethylsulfonamidoanilino)-1,3,5-triazine
2-amino-4-(p-trifluoroacetylanilino)-1,3,5-triazine
2-amino-4-(p-trifluoromethylsulfonylanilino)-1,3,5-triazine
2-amino-4-(p-di-trifluoromethylsulfonamidoanilino)-1,3,5-triazine
2-amino-4-(p-carboxyanilino)-1,3,5-triazine
2-amino-4-(p-carbethoxyanilino)-1,3,5-triazine
2-amino-4-(p-carbamylanilino)-1,3,5-triazine
2-amino-4-(2,3-difluoroanilino)-1,3,5-triazine
2-amino-4-(2,4-difluoroanilino)-1,3,5-triazine
2-amino-4-(2,5-difluoroanilino)-1,3,5-triazine
2-amino-4-(2,6-difluoroanilino)-1,3,5-triazine
2-amino-4-(3,4-difluoroanilino)-1,3,5-triazine
2-amino-4-(3,5-difluoroanilino)-1,3,5-triazine
2-amino-4-(2-cyano-4-chloroanilino)-1,3,5-triazine
2-amino-4-(2-trifluoromethyl-4-fluoroanilino)-1,3,5-triazine
2-amino-4-(2-trifluoromethyl-4-chloroanilino)-1,3,5-triazine
2-amino-4-(2-trifluoromethyl-4-bromoanilino)-1,3,5-triazine
2-amino-4-(2-trifluoromethyl-4-nitroanilino)-1,3,5-triazine
2-amino-4-(2-trifluoromethyl-4-iodoanilino)-1,3,5-triazine
2-amino-4-(3-trifluoromethyl-4-fluoroanilino)-1,3,5-triazine
2-amino-4-(3-trifluoromethyl-4-bromoanilino)-1,3,5-triazine
2-amino-4-(3-trifluoromethyl-4-chloroanilino)-1,3,5-triazine
2-amino-4-(3-trifluoromethyl-4-nitroanilino)-1,3,5-triazine
2-amino-4-(4-trifluoromethyl-2-fluoroanilino)-1,3,5-triazine
2-amino-4-(4-trifluoromethyl-2-chloroanilino)-1,3,5-triazine
2-amino-4-(4-trifluoromethyl-2-bromoanilino)-1,3,5-triazine
2-amino-4-(4-trifluoromethyl-2-nitroanilino)-1,3,5-triazine
2-amino-4-(4-trifluoromethyl-3-fluoroanilino)-1,3,5-triazine
2-amino-4-(4-trifluoromethyl-3-chloroanilino)-1,3,5-triazine
2-amino-4-(4-trifluoromethyl-3-bromoanilino)-1,3,5-triazine
2-amino-4-(4-trifluoromethyl-3-nitroanilino)-1,3,5-triazine
2-amino-4-(2-fluoro-5-trifluoromethylanilino)-1,3,5-triazine
2-amino-4-(2-chloro-5-trifluoromethylanilino)-1,3,5-triazine
2-amino-4-(2-bromo-5-trifluoromethylanilino)-1,3,5-triazine
2-amino-4-(2-nitro-5-trifluoromethylanilino)-1,3,5-triazine
2-amino-4-(2-fluoro-4-chloroanilino)-1,3,5-triazine
2-amino-4-(2-chloro-4-fluoroanilino)-1,3,5-triazine
2-amino-4-(2-chloro-6-fluoroanilino)-1,3,5-triazine
2-amino-4-(2,3-dibromoanilino)-1,3,5-triazine
2-amino-4-(2,5-dibromoanilino)-1,3,5-triazine
2-amino-4-(2,6-dibromoanilino)-1,3,5-triazine
2-amino-4-(2,3-dichloroanilino)-1,3,5-triazine
2-amino-4-(2,6-dichloroanilino)-1,3,5-triazine
2-amino-4-(2,3,4-trichloroanilino)-1,3,5-triazine
2-amino-4-(2,3,5-trichloroanilino)-1,3,5-triazine
2-amino-4-(2,3,6-trichloroanilino)-1,3,5-triazine
2-amino-4-(2,4,5-trichloroanilino)-1,3,5-triazine
2-amino-4-(2,4,6-trichloroanilino)-1,3,5-triazine
2-amino-4-(2,3,5,6-tetrafluoroanilino)-1,3,5-triazine
2-amino-4-(2,3,4,5,6-pentafluoroanilino)-1,3,5-triazine
2-amino-4-(2,6-dichloro-4-bromoanilino)-1,3,5-triazine
2-amino-4-(2,6-dichloro-4-fluoroanilino)-1,3,5-triazine
2-amino-4-(2,6-dichloro-4-iodoanilino)-1,3,5-triazine
2-amino-4-(2,6-dichloro-4-nitroanilino)-1,3,5-triazine
2-amino-4-(2,6-dichloro-4-trifluoromethylanilino)-1,3,5-triazine
2-amino-4-(2,4-dichloro-6-bromoanilino)-1,3,5-triazine
2-amino-4-(2-trifluoromethyl-4-aminoanilino)-1,3,5-triazine
2-amino-4-(2-trifluoromethyl-4-acetylaminoanilino)-1,3,5-triazine
2-amino-4-(4-amino-3-trifluoromethylanilino)-1,3,5-triazine
2-amino-4-(4-dimethylamino-3-trifluoromethyl)-1,3,5-triazine
2-amino-4-(3,5-ditrifluoromethylanilino)-1,3,5-triazine
2-amino-4-(4-hydroxy-3-trifluoromethylanilino)-1,3,5-triazine
2-amino-4-(2-cyano-4-trifluoromethylanilino)-1,3,5-triazine
2-amino-4-(4-methoxy-3-trifluoromethylanilino)-1,3,5-triazine
2-amino-4-(2,6-dimethylsulfonylanilino)-1,3,5-triazine
2-amino-4-(2,4-dinitroanilino)-1,3,5-triazine
2-methylamino-4-(4-fluoro-2-trifluoromethylanilino)-1,3,5-triazine
2-ethylamino-4-(4-fluoro-2-trifluoromethylanilino)-1,3,5-triazine
2-propylamino-4-(4-fluoro-2-trifluoromethylanilino)-1,3,5-triazine
2-i-propylamino-4-(4-fluoro-2-trifluoromethylanilino)-1,3,5-triazine
2-t-butylamino-4-(4-fluoro-2-trifluoromethylanilino)-1,3,5-triazine
2-pentylamino-4-(4-fluoro-2-trifluoromethylanilino)-1,3,5-triazine
2-allylamino-4-(4-fluoro-2-trifluoromethylanilino)-1,3,5-triazine 2-cyclopropylamino-4-(4-fluoro-2-trifluoromethyl-
  anilino)-1,3,5-triazine
2-benzylamino-4-(4-fluoro-2-trifluoromethylanilino)-
  1,3,5-triazine The compounds of this invention may be prepared by the following general procedures.

Condensation of a 1-substituted phenylbiguanide with a formic acid or derivative in the presence of an inert solvent results in ring closure to the corresponding 2-amino-4-substituted anilino-1,3,5-triazine.

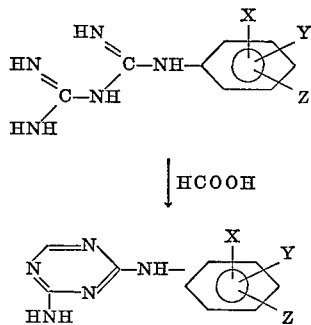

The reaction may be carried out using a formic acid ester, salt or amide derivative such as ethyl formate, propyl formate, benzyl formate, formamide, formamidine, sodium formate and the like. The biguanide may be present in the form of a salt. It is convenient to carry out the reaction in the presence of an inert solvent and it is preferable to use a polar solvent such as methanol, ethanol, 2-ethoxyethanol, dimethylformamide, dimethylsulfoxide, acetic acid, propionic acid, etc. The reaction may also be carried out using an excess of the formic acid derivative as solvent. Reaction at room temperature usually takes place within a few hours; however, heating of the reaction mixture is preferred since the reaction proceeds more rapidly.

The triazine product is isolated by any of the methods known in the art such as evaporating the reaction mixture to dryness, adding cold aqueous base and extracting or filtering the triazine product.

When it is desired to have a secondary amine present in the 2-position, it is preferable to carry out the reaction on a suitable 1,5-disubstituted biguanide.

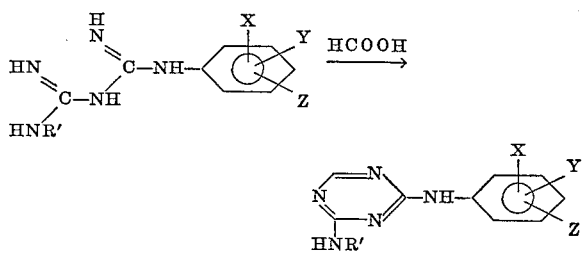

The biguanide compounds used as starting materials in this invention are either known compounds or they may be prepared by reaction of a cyanoguanide and an aniline in the presence of an equimolar amount of a mineral acid.

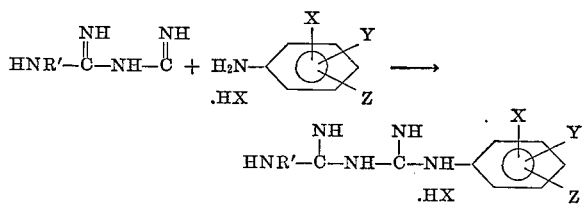

A special embodiment of this invention describes a novel process for preparing the starting biguanide compounds which are substituted in the 1,5-positions. We have unexpectedly found that when the reaction of the substituted aniline with substituted cyanoguanidine takes place in a mildly acidic solvent which is non-nucleophilic then the condensation takes place in high yield. We have further found that this reaction works on highly hindered as well as highly unreactive anilines. We have also found that this condensation further can be carried between a 1-cyano-3-substituted phenyl guanidine and an aliphatic amine to yield the desired 1,5-disubstituted biguanides. It is preferable to use a phenolic solvent such as phenol, cresol, xylol, etc. The reaction can be carried out at temperatures from room temperature to about 150° C.; however, it is preferable to use temperatures between 60–100° C. Isolation of the reaction product can be carried out by chemical or physical techniques; however, it is convenient to precipitate the salt of the product out of the reaction mixture with a nonpolar solvent such as ether or by making the reaction mixture alkaline and extracting with ether.

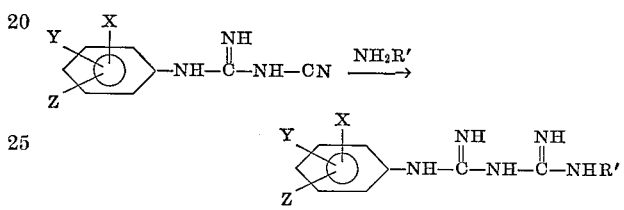

This reaction is preferably carried out on the aniline salt either in a polar medium or vent and using increased temperatures. The salt used may be any acid addition amine salt but preferably the salt of a mineral acid. The polar medium may be aqueous, partially aqueous or non-aqueous acid solvents such as dimethylsulfoxide, diethyleneglycol, tetrahydrofuran, dimethylformamide, etc. The reaction is usually carried out at raised temperatures and the isolation is by any method known in the art.

Appropriately desired X, Y and Z substituents can be prepared at various stages of synthesis using suitable reaction in order to convert one group to another. Thus, for example, nitration of the anilide can be carried out to obtain ortho and/or para substitution with or without other substituents present. This may then be reduced to an amino group which in turn may be diazotized followed by a Sandmeyer type reaction to yield chloro or bromo. The diazo compound may be converted to a cyano with cuprous cyanide; iodo with potassium iodide, or hydroxy or alkoxy with water or alcohol. The diazonium fluoroborate may also be formed and then thermally decomposed to the fluoro compound. The amine may also be mono- or dialkylated or acetylated. Halogenation may be carried out on the aniline to obtain ortho and/or para chloro, bromo or iodo substituents. The chloro, bromo or iodo compound may then be treated with cuprous cyanide to obtain the cyano compound. The chloro or bromo comround may be reacted with trifluoromethyliodide and copper powder at about 150° C. to obtain the trifluoromethyl. Reaction of the chloro or bromo with methanesulfinate in quinoline at about 150° C. results in the methylsulfonyl.

When substitution is desired in the meta position, nitration or halogenation may be carried out on an acetophenone. The resulted meta substituted compound may then be converted to the oxime and treated under Beckmann rearrangement conditions to the acetanilide.

In an analogous manner other reactions known in the art may also be employed and further methods are described in the examples.

We have found that the 2-amino-4-anilino-1,3,5-triazine compounds of this invention are therapeutically useful as medicinal agents. They have a high degree of diuretic activity and as such provide significant usefulness in the treatment of related pharmacological disorders. The 2-amino-4-anilino-1,3,5-triazines while being effective agents are also relatively non-toxic, maintain a desired electrolyte balance and are not prone to produce hyperurecemia actions.

The compounds of this invention further exhibit antihypertensive properties. They provide significant reduction in hypertension conditions and disorders and afford relief to associated organs affected by the hypertensive disease.

We have also found that the compounds of this invention have useful antiulcerogenic properties. Further, they have an effective degree of gastric antisecretory activity, i.e., they reduce the volume and the acidity of the gastric fludi in humans and mammals. Still further, these compounds produce a considerable spasmolytic action on the gastrointestinal musculature, i.e., they reduce the peristaltic action of the gastrointestinal musculature which is manifested by a delay in gastric emptying time.

We have further found that the 4-anilino-2-amino-1,3,5-triazine compounds of this invention are particularly useful as antisecretory, antispasmodic and antiulcerogenic agents because they are essentially devoid of unwanted side effects such as mydriasis, xerostomia, cyclopegia and the like.

In particular, the compounds as herein described are useful in the treatment of such gastrointestinal disorders and diseases as duodenal ulcer and peptic ulcer.

For all these purposes, the 2-amino-4-anilino-1,3,5-triazine compounds of this invention can be administered orally or parenterally, but they are preferably administered orally. Orally, they may be administered as tablets, aqueous or oily suspension, dispersible powders or granules, emulsions, hard or soft capsules, or syrups or elixirs. The term parenteral, as used herein, includes subcutaneous injection, intramuscular injection or infusion techniques.

Compositions intended for oral use may be prepared according to any method known to the art for the manufacture of pharmaceutical compositions and such compositions may contain one or more agents selected from the group consisting of sweetening agents, flavoring agents, coloring agents and preserving agents, in order to provide a pharmaceutically elegant and palatable preparation.

Further, these compounds may be tableted or otherwise formulated so that for every 100 part by weight of the composition, there are present between 5 and 95 parts by weight of the active ingredient. The dosage unit form will generally contain between about 1 mg. and about 500 mg. of the active ingredients of this invention. The preferred unit dose is between about 10 mg. and 100 mg.

The dosage regimen in carrying out the methods of this invention is that which insures maximum therapeutic response until improvement is obtained and thereafter the minimum effective level which gives relief. Thus, in general, the dosages are those that are therapeutically effective in the treatment of diuretic, hypertension and ulcerogenic disease conditions or symptoms. In general, the daily dose can be between about 0.1 mg./kg. and 50 mg./kg. (preferably in the range of 1–25 mg./kg./day). Bearing in mind, of course, that in selecting the appropriate dosage in any specific case, consideration must be given to the patient's weight, general health, age and other factors which may influence response to the drug.

Various tests in animals can be carried out to show the ability of the compounds of this invention to exhibit reactions that can be correlated with activity in humans. It has been found that the compounds of this invention when tested in a variety of such situations show a marked activity.

To determine the effectiveness of the triazines of this invention tests may be carried out to show the relation of urine output of a test animal to body weight, fluid load and food intake. A study by multiple regression analysis in control animal versus the test animals can be used to determine the effectiveness of a particular triazine compound compared to effectiveness of a known diuretic agent. These tests are outlined by J. R. Cummings et al., J. Pharmacol. Expt. Therap.: 128,414 (1960); R. A. Turner, Screening Methods in Pharmacology, Academic Press, New York and London, Ch. 36 (1965); Nechay, Bohdan R. "Evaluation of Diuretic Agents," in Burger, Alfred, et.: Selected Pharmacological Testing Methods, vol. 3, Medicinal Research: A Series of Monographs, New York: Marcel Dekker Inc., 1968.

In view of the results of these tests, the pharmacological data clearly indicates that the triazine compounds of this invention can be considered to be effective diuretic agents which maintain a proper electrolyte balance and are substantially free of hyperurecemia side effects.

Tests in animals may also be carried out to show the ability of the 2-amino-4-anilino-1,3,5-triazine compounds of this invention to inhibit reactions that can be correlated with hypertensive effects in humans. One such test is outlined by Jacques de Champlain, Lawrence R. Krahoff and Julius Axelrod in Circulation Research, XXIII: 479 (1968). This testing method is known to correlate well with hypertensive activity in humans and is a standard test used to determine antihypertensive properties. In view of the results of this test, the 2-amino-4-anilino-1,3,5-triazine compounds of this invention can be considered to be active antihypertensive agents.

Another test is the gastric secretion test. This test is carried out as follows: Shay rats are fasted for 4–8 hours, and water is given ad lib. The rats are selected at random and separated into groups of 10. The animals are treated intraduodenally (I.D.) with the test compound or the vehicle immediately subsequent to the ligation of the stomach at the pyloric sphincter. The animals are sacrificed with chloroform at 4 hours post-drug administration, the stomach is removed and its contents are assayed for volume, pH and total acids.

A second gastric secretion test is carried out on dogs. This is outlined in the Handbook of Physiology, Section 6: Alimentary Canal, vol. II: Secretion, American Physiology Society, Washington, D.C., 1967.

It has been found that the compounds of this invention when subjected to the above gastric secretion tests display a marked ability to decrease gastric volume and gastric acidity. These tests are known to correlate well with gastric activity in humans and is a standard test used to determine antisecretory properties.

To determine the antiulcer effectiveness, the following test is employed: Male Wistar rats (130–150 grams) are fasted for 24 hours, then given reserpine at 5 mg./kg. i.p. Twenty-four hours later, the stomachs are removed and examined for ulceration. Ulcers are graded on a 0–4 scale and the number of ulcers is recorded. Pretreatment with the triazine of this invention produces a decrease in ulcer grade and the number of ulcers compared to the control reserpine-treated rats.

Determination of antispasmodic properties can be carried out by the procedure as outlined by D. A. Brodie and S. K. Kundrats in their article entitled "Effect of Drugs on Gastric Emptying in Rats," Fed. Proc. 24:714 (1965).

Mydriasis is detected by the procedure R. A. Turner, Screening Methods in Pharmacology, Academic Press, New York and London, pp. 174–5, 1965. Acute toxicity is calculated according to the standard Litchfield-Wilcoxon procedure.

In view of the results of these tests, the pharmacological data clearly indicates that the triazine compounds of this invention can be considered to be effective antiulcerogenic, antisecretory and antispasmodic agents which are substantially free of anticholinergic side effects and having a low toxicity.

EXAMPLE 1

2-amino-4-(2-trifluoromethyl-4-fluoroanilino)-1,3,5-triazine

A mixture of 44 g. of 1-(2-trifluoromethyl-4-fluorophenyl)biguanide in 350 ml. of toluene and 20 ml. of ethyl formate is refluxed until water ceases to distill off. To this is added 13 ml. of triethylamine and 10 ml. of ethylformate. The mixture is refluxed for 2 hours to allow further water distilling off. The mixture is then chilled, the solid material is then separated and recrystallized from ethanol to obtain 2-amino-4-(2-trifluoromethyl-4-fluoroanilino)-1,3,5-triazine.

When the above procedure is followed using the starting materials as shown below, then the corresponding triazine product is prepared.

| Starting material | Product |
|---|---|
| 1-(p-trifluoromethoxyphenyl)biguanide. | 2-amino-4-(p-trifluoromethoxyanilino)1,3,5-triazine. |
| 1-(p-methylsulfonylphenyl)biguanide. | 2-amino-4-(p-methylsulfonylanilino)-1,3,5-triazine. |
| 1-(p-dimethylsulfonamidophenyl)biguanide. | 2-amino-4-(p-dimethylsulfonamidoanilino)-1,3,5-triazine. |
| 1-(p-trifluoroacetylphenyl)biguanide. | 2-amino-4-(p-trifluoroacetylanilino)-1,3,5-triazine. |
| 1-(p-trifluoromethylsulfonylphenyl)biguanide. | 2-amino-4-(p-trifluoromethylsulfonylanilino)-1,3,5-triazine. |
| 1-(p-di-trifluoromethylsulfonamidophenyl)biguanide. | 2-amino-4-(p-di-trifluoromethylsulfonamidoanilino)-1,3,5-triazine. |
| 1-(p-carboxyphenyl)biguanide | 2-amino-4-(p-carboxyanilino)-1,3,5-triazine. |
| 1-(p-carbethoxyphenyl)biguanide | 2-amino-4-(p-carbethoxyanilino)-1,3,5-triazine. |
| 1-(p-carbamylphenyl)biguanide | 2-amino-4-(p-carbamylanilino)-1,3,5-triazine. |
| 1-(2,3-difluorophenyl)biguanide | 2-amino-4-(2,3-difluoroanilino)-1,3,5-triazine. |
| 1-(2,4-difluorophenyl)biguanide | 2-amino-4-(2,4-difluoroanilino)-1,3,5-triazine. |
| 1-(2,5-difluorophenyl)biguanide | 2-amino-4-(2,5-difluoroanilino)-1,3,5-triazine. |
| 1-(2,6-difluorophenyl)biguanide | 2-amino-4-(2,6-difluoroanilino)-1,3,5-triazine. |
| 1-(3,4-difluorophenyl)biguanide | 2-amino-4-(3,4-difluoroanilino)-1,3,5-triazine. |
| 1-(3,5-difluorophenyl)biguanide | 2-amino-4-(3,5-difluoroanilino)-1,3,5-triazine. |
| 1-(2-cyano-4-chlorophenyl)biguanide. | 2-amino-4-(2-cyano-4-chloroanilino)-1,3,5-triazine. |
| 1-(2-trifluoromethyl-4-fluorophenyl)biguanide. | 2-amino-4-(2-trifluoromethyl-4-fluoroanilino)-1,3,5-triazine. |
| 1-(2-trifluoromethyl-4-chlorophenyl)biguanide. | 2-amino-4-(2-trifluoromethyl-4-chloroanilino)-1,3,5-triazine. |
| 1-(2-trifluoromethyl-4-bromophenyl)biguanide. | 2-amino-4-(2-trifluoromethyl-4-bromoanilino)-1,3,5-triazine. |
| 1-(2-trifluoromethyl-4-nitrophenyl)biguanide. | 2-amino-4-(2-trifluoromethyl-4-nitroanilino)-1,3,5-triazine. |
| 1-(2-trifluoromethyl-4-iodophenyl)biguanide. | 2-amino-4-(2-trifluoromethyl-4-iodoanilino)-1,3,5-triazine. |
| 1-(3-trifluoromethyl-4-fluorophenyl)biguanide. | 2-amino-4-(3-trifluoromethyl-4-fluoroanilino)-1,3,5-triazine. |
| 1-(3-trifluoromethyl-4-bromophenyl)biguanide. | 2-amino-4-(3-trifluoromethyl-4-bromoanilino)-1,3,5-triazine. |
| 1-(3-trifluoromethyl-4-chlorophenyl)biguanide. | 2-amino-4-(3-trifluoromethyl-4-chloroanilino)-1,3,5-triazine. |
| 1-(3-trifluoromethyl-4-nitrophenyl)biguanide. | 2-amino-4-(3-trifluoromethyl-4-nitroanilino)-1,3,5-triazine. |
| 1-(3-trifluoromethyl-4-iodophenyl)biguanide. | 2-amino-4-(3-trifluoromethyl-4-iodoanilino)-1,3,5-triazine. |
| 1-(4-trifluoromethyl-2-fluorophenyl)biguanide. | 2-amino-4-(4-trifluoromethyl-2-fluoroanilino)-1,3,5-triazine. |
| 1-(4-trifluoromethyl-2-chlorophenyl)biguanide. | 2-amino-4-(4-trifluoromethyl-2-chloroanilino)-1,3,5-triazine. |
| 1-(4-trifluoromethyl-2-bromophenyl)biguanide. | 2-amino-4-(4-trifluoromethyl-2-bromoanilino)-1,3,5-triazine. |
| 1-(4-trifluoromethyl-2-nitrophenyl)biguanide. | 2-amino-4-(4-trifluoromethyl-2-nitroanilino)-1,3,5-triazine. |
| 1-(4-trifluoromethyl-2-iodophenyl)biguanide. | 2-amino-4-(4-trifluoromethyl-2-iodoanilino)-1,3,5-triazine. |
| 1-(4-trifluoromethyl-3-fluorophenyl)biguanide. | 2-amino-4-(4-trifluoromethyl-3-fluoroanilino)-1,3,5-triazine. |
| 1-(4-trifluoromethyl-3-chlorophenyl)biguanide. | 2-amino-4-(4-trifluoromethyl-3-chloroanilino)-1,3,5-triazine. |
| 1-(4-trifluoromethyl-3-bromophenyl)biguanide. | 2-amino-4-(4-trifluoromethyl-3-bromoanilino)-1,3,5-triazine. |
| 1-(4-trifluoromethyl-3-nitrophenyl)biguanide. | 2-amino-4-(4-trifluoromethyl-3-nitroanilino)-1,5,3-triazine. |
| 1-(4-trifluoromethyl-3-iodophenyl)biguanide. | 2-amino-4-(4-trifluoromethyl-3-iodoanilino)-1,3,5-triazine. |
| 1-(2-fluoro-5-trifluoromethylphenyl)biguanide. | 2-amino-4-(2-fluoro-5-trifluoromethylanilino)-1,3,5-triazine. |
| 1-(2-chloro-5-trifluoromethylphenyl)biguanide. | 2-amino-4-(2-chloro-5-trifluoromethylanilino)-1,3,5-triazine. |
| 1-(2-bromo-5-trifluoromethylphenyl)biguanide. | 2-amino-4-(2-bromo-5-trifluoromethylanilino)-1,3,5-triazine. |
| 1-(2-nitro-5-trifluoromethylphenyl)biguanide. | 2-amino-4-(2-nitro-5-trifluoromethylanilino)-1,3,5-triazine. |
| 1-(2-iodo-5-trifluoromethylphenyl)biguanide. | 2-amino-4-(2-iodo-5-trifluoromethylanilino)-1,3,5-triazine. |
| 1-(2-trifluoromethyl-3-fluorophenyl)biguanide. | 2-amino-4-(2-trifluoromethyl-3-fluoroanilino)-1,3,5-triazine. |
| 1-(2-trifluoromethyl-3-chlorophenyl)biguanide. | 2-amino-4-(2-trifluoromethyl-3-chloranilino)-1,3,5-triazine. |
| 1-(2-trifluoromethyl-3-bromophenyl)biguanide. | 2-amino-4-(2-trifluoromethyl-3-bromoanilino)-1,3,5-triazine. |
| 1-(2-trifluoromethyl-3-iodophenyl)biguanide. | 2-amino-4-(2-trifluoromethyl-3-iodoanilino)-1,3,5-triazine. |
| 1-(2-trifluoromethyl-3-nitrophenyl)biguanide. | 2-amino-4-(2-trifluoromethyl-3-nitroanilino)-1,3,5-triazine. |
| 1-(2-trifluoromethyl-5-fluorophenyl)biguanide. | 2-amino-4-(2-trifluoromethyl-5-fluoroanilino)-1,3,5-triazine. |
| 1-(2-trifluoromethyl-5-chlorophenyl)biguanide. | 2-amino-4-(2-trifluoromethyl-5-chloroanilino)-1,3,5-triazine. |
| 1-(2-trifluoromethyl-5-bromophenyl)biguanide. | 2-amino-4-(2-trifluoromethyl-5-bromoanilino)-1,3,5-triazine. |
| 1-(2-trifluoromethyl-5-iodophenyl)biguanide. | 2-amino-4-(2-trifluoromethyl-5-iodoanilino)-1,3,5-triazine. |
| 1-(2-trifluoromethyl-5-nitrophenyl)biguanide. | 2-amino-4-(2-trifluoromethyl-5-nitroanilino)-1,3,5-triazine. |
| 1-(3-trifluoromethyl-2-fluorophenyl)biguanide. | 2-amino-4-(3-trifluoromethyl-2-fluoroanilino)-1,3,5-triazine. |
| 1-(3-trifluoromethyl-2-chlorophenyl)biguanide. | 2-amino-4-(3-trifluoromethyl-2-chloroanilino)-1,3,5-triazine. |
| 1-(3-trifluoromethyl-2-bromophenyl)biguanide. | 2-amino-4-(3-trifluoromethyl-2-bromoanilino)-1,3,5-triazine. |
| 1-(3-trifluoromethyl-2-iodophenyl)biguanide. | 2-amino-4-(3-trifluoromethyl-2-iodoanilino)-1,2,5-triazine. |
| 1-(3-trifluoromethyl-2-nitrophenyl)biguanide. | 2-amino-4-(3-trifluoromethyl-2-nitroanilino)-1,3,5-triazine. |
| 1-(3-trifluoromethyl-5-fluorophenyl)biguanide. | 2-amino-4-(3-trifluoromethyl-5-fluoroanilino)-1,3,5-triazine. |
| 1-(3-trifluoromethyl-5-chlorophenyl)biguanide. | 2-amino-4-(3-trifluoromethyl-5-chloroanilino)-1,3,5-triazine. |
| 1-(3-trifluoromethyl-5-bromophenyl)biguanide. | 2-amino-4-(3-trifluoromethyl-5-bromoanilino)-1,3,5-triazine. |
| 1-(3-trifluoromethyl-5-iodophenyl)biguanide. | 2-amino-4-(3-trifluoromethyl-5-iodoanilino)-1,3,5-triazine. |
| 1-(3-trifluoromethyl-5-nitrophenyl)biguanide. | 2-amino-4-(3-trifluoromethyl-5-nitroanilino)-1,3,5-triazine. |
| 1-(2-fluoro-4-chlorophenyl)biguanide. | 2-amino-4-(2-fluoro-4-chloroanilino)-1,3,5-triazine. |
| 1-(2-chloro-4-fluorophenyl)biguanide. | 2-amino-4-(2-chloro-4-fluoroanilino)-1,3,5-triazine. |
| 1-(2-chloro-6-fluorophenyl)biguanide. | 2-amino-4-(2-chloro-6-fluoroanilino)-1,3,5-triazine. |
| 1-(2,3-dibromophenyl)biguanide | 2-amino-4-(2,3-dibromoanilino)-1,3,5-triazine. |
| 1-(2,5-dibromophenyl)biguanide | 2-amino-4-(2,5-dibromoanilino)-1,3,5-triazine. |
| 1-(2,6-dibromophenyl)biguanide | 2-amino-4-(2,6-dibromnilino)-1,3,5-triazine. |
| 1-(2,3-dichlorophenyl)biguanide | 2-amino-4-(2,3-dichloroanilino)-1,3,5-triazine. |
| 1-(2,6-dichlorophenyl)biguanide | 2-amino-4-(2,6-dichloroanilino)-1,3,5-triazine. |
| 1-(2,3,4-trichlorophenyl)biguanide | 2-amino-4-(2,3,4-trichloroanilino)-1,3,5-triazine. |
| 1-(2,3,5-trichlorophenyl)biguanide | 2-amino-4-(2,3,5-trichloroanilino)-1,3,5-triazine. |
| 1-(2,3,6-trichlorophenyl)biguanide | 2-amino-4-(2,3,6-trichloroanilino)-1,3,5-triazine. |
| 1-(2,4,5-trichlorophenyl)biguanide | 2-amino-4-(2,4,5-trichloroanilino)-1,3,5-triazine. |
| 1-(2,4,6-trichlorophenyl)biguanide | 2-amino-4-(2,4,6-trichloroanilino)-1,3,5-triazine. |
| 1-(2,3,5,6-tetrafluorophenyl)biguanide. | 2-amino-4-(2,3,5,6-tetrafluoroanilino)-1,3,5-triazine. |
| 1-(2,3,4,5,6-pentafluorophenyl)biguanide. | 2-amino-4-(2,3,4,5,6-pentafluoroanilino)-1,3,5-triazine. |
| 1-(2,6-dichloro-4-bromophenyl)biguanide. | 2-amino-4-(2,6-dichloro-4-bromoanilino)-1,3,5-triazine. |
| 1-(2,6-dichloro-4-fluorophenyl)biguanide. | 2-amino-4-(2,6-dichloro-4-fluoroanilino)-1,3,5-triazine. |
| 1-(2,6-dichloro-4-iodophenyl)biguanide. | 2-amino-4-(2,6-dichloro-4-iodoanilino)-1,3,5-triazine. |
| 1-(2,6-dichloro-4-nitrophenyl)biguanide. | 2-amino-4-(2,6-dichloro-4-nitroanilino)-1,3,5-triazine. |
| 1-(2,6-dichloro-4-trifluoromethylphenyl)biguanide. | 2-amino-4-(2,6-dichloro-4-trifluoromethylanilino)-1,3,5-triazine. |
| 1-(2,4-dichloro-6-bromophenyl)biguanide. | 2-amino-4-(2,4-dichloro-6-bromoanilino)-1,3,5-triazine. |
| 1-(2-trifluoromethyl-4-aminophenyl)biguanide. | 2-amino-4-(2-trifluoromethyl-4-aminoanilino)-1,3,5-triazine. |
| 1-(2-trifluoromethyl-4-acetylaminophenyl)biguanide. | 2-amino-4-(2-trifluoromethyl-4-acetylaminoanilino)-1,3,5-triazine. |
| 1-(4-amino-3-trifluoromethylphenyl)biguanide. | 2-amino-4-(4-amino-3-trifluoromethylanilino)-1,3,5-triazine. |
| 1-(4-dimethylamino-3-trifluoromethylphenyl)biguanide. | 2-amino-4-(4-dimethylamino-3-trifluoromethylanilino)-1,3,5-triazine. |
| 1-(3,5-ditrifluoromethylphenyl)biguanide. | 2-amino-4-(3,5-ditrifluoromethylanilino)-1,3,5-tiriazine. |
| 1-(4-hydroxy-3-trifluoromethylphenyl)biguanide. | 2-amino-4-(4-hydroxy-3-trifluoromethylanilino)-1,3,5-triazine. |
| 1-(2-cyano-4-trifluoromethylphenyl)biguanide. | 2-amino-4-(2-cyano-4-trifluoromethylanilino)-1,3,5-triazine. |
| 1-(4-methoxy-3-trifluoromethylphenyl)biguanide. | 2-amino-4-(4-methoxy-3-trifluoromethylanilino)-1,3,5-triazine. |
| 1-(2,4 dimethylsulfonylphenyl)biguanide. | 2-amino-4-(2,4-dimethylsulfonylanilino)-1,3,5-triazine. |
| 1-(2,4,dinitrophenyl)biguanide | 2-amino-4-(2,4-dinitroanilino)-1,3,5-triazine. |
| 1-(2-bromo-4-methylphenyl)biguanide. | 2-amino-4-(2-bromo-4-methylanilino)-1,3,5-triazine. |
| 1-(2,6-dichloro-4-methylphenyl)biguanide. | 2-amino-4-(2,6-dichloro-4-methylanilino)-1,3,5-triazine. |
| 1-(2,4-dichloro-4-methylphenyl)biguanide. | 2-amino-4-(2,4-dichloro-4-methylanilino)-1,3,5-triazine. |
| 1-(2,5-dichloro-3-methylphenyl)biguanide. | 2-amino-4-(2,5-dichloro-3-methylanilino)-1,3,5-triazine. |
| 1-(2-iodo-4-methyl-6-chlorophenyl)biguanide. | 2-amino-4-(2-iodo-4-methyl-6-chloroanilino)-1,3,5-triazine. |
| 1-(2-chloro-4-bromo-6-fluorophenyl)biguanide. | 2-amino-4-(2-chloro-4-bromo-6-fluoroanilino)-1,3,5-triazine. |

EXAMPLE 2

2-ethylamino-4-(2,6-dichloro-4-bromoanilino)-1,3,5-triazine

A mixture of 17.7 g. (0.05 moles) of 1-(2,6-dichloro-4-bromophenyl)-5-ethylbiguanide in 200 ml. of benzene and 12 ml. of ethyl formate is refluxed until water ceases to distill off. The reaction mixture is then evaporated to dryness and the residue recrystallized from isopropanol to obtain 2-ethylamino-4-(2,6-dichloro-4-bromoanilino)-1,3,5-triazine.

When the above procedure is followed using the starting materials as shown below, then the corresponding triazine products are prepared.

| Starting Material | Product |
| --- | --- |
| 1-(4-fluoro-2-trifluoromethylphenyl)-5-methylbiguanide. | 2-methylamino-4-(4-fluoro-2-trifluoromethylanilino)-1,3,5-triazine. |
| 1-(4-fluoro-2-trifluoromethylphenyl)-5-ethylbiguanide. | 2-ethylamino-4-(4-fluoro-2-trifluoromethylanilino)-1,3,5-triazine. |
| 1-(4-fluoro-2-trifluoromethylphenyl)-5-propylbiguanide. | 2-propylamino-4-(4-fluoro-2-trifluoromethylanilino)-1,3,5-triazine. |
| 1-(4-fluoro-2-trifluoromethylphenyl)-5-i-propylbiguanide. | 2-i-propylamino-4-(4-fluoro-2-trifluoromethylanilino)-1,3,5-triazine. |
| 1-(4-fluoro-2-trifluoromethylphenyl)-5-t-butylbiguanide. | 2-t-butylamino-4-(4-fluoro-2-trifluoromethylanilino)-1,3,5-triazine. |
| 1-(4-fluoro-2-trifluoromethylphenyl)-5-pentylbiguanide. | 2-pentylamino-4-(4-fluoro-2-trifluoromethylanilino)-1,3,5-triazine. |
| 1-(4-fluoro-2-trifluoromethylphenyl)-5-allylbiguanide. | 2-allylamino-4-(4-fluoro-2-trifluoromethylanilino)-1,3,5-triazine. |
| 1-(4-fluoro-2-trifluoromethylphenyl)-5-methallylbiguanide. | 2-methallylamino-4-(4-fluoro-2-trifluoromethylanilino)-1,3,5-triazine. |
| 1-(4-fluoro-2-trifluoromethylphenyl)-5-cyclopropylbiguanide. | 2-cyclopropylamino-4-(4-fluoro-2-trifluoromethylanilino)-1,3,5-triazine. |
| 1-(4-fluoro-2-trifluoromethylphenyl)-5-cyclobutylbiguanide. | 2-cyclobutylamino-4-(4-fluoro-2-trifluoromethylanilino)-1,3,5-triazine. |
| 1-(4-fluoro-2-trifluoromethylphenyl)-5-benzylbiguanide. | 2-benzylamino-4-(4-fluoro-2-trifluoromethylanilino)-1,3,5-triazine. |
| 1-(4-fluoro-2-trifluoromethylphenyl)5-phenethylbiguanide. | 2-phenethylamino-4-(4-fluoro-2-trifluoromethylanilino)-1,3,5-triazine. |
| 1-(p-trifluoromethoxyphenyl)-5-methylbiguanide. | 2-methylamino-4-(p-trifluoromethoxyanilino)-1,3,5-triazine. |
| 1-(p-methylsulfonylphenyl)-5-ethylbiguanide. | 2-ethylamino-4-(p-methylsulfonylanilino)-1,3,5-triazine. |
| 1-(p-dimethylsulfonamidophenyl)-5-ethylbiguanide. | 2-ethylamino-4-(p-dimethylsulfonamidoanilino)-1,3,5-triazine. |
| 1-(p-trifluoroacetylphenyl)-5-ethylbiguanide. | 2-ethylamino-4-(p-trifluoroacetylanilino)-1,3,5-triazine. |
| 1-(p-trifluoromethylsulfonylphenyl)-5-ethylbiguanide. | 2-ethylamino-4-(p-trifluoromethylsulfonylanilino)-1,3,5-triazine. |
| 1-(p-di-trifluoromethylsulfonamidophenyl)-5-ethylbiguanide. | 2-ethylamino-4-(p-di-trifluoromethylsulfonamidoanilino)-1,3,5-triazine. |
| 1-(2,3-difluorophenyl)-5-ethylbiguanide. | 2-ethylamino-4-(2,3-difluoroanilino)-1,3,5-triazine. |
| 1-(2,4-difluorophenyl)-5-i-propylbiguanide. | 2-i-propylamino-4-(2,4-difluoroanilino)-1,3,5-triazine. |
| 1-(2,6-difluorophenyl)-5-ethylbiguanide. | 2-ethylamino-4-(2,6-difluoroanilino)-1,3,5-triazine. |
| 1-(2-cyano-4-chlorophenyl)-5-methylbiguanide. | 2-methylamino-4-(2-cyano-4-chloroanilino)-1,3,5-triazine. |
| 1-(2-trifluoromethyl-4-chlorophenyl)-5-cyclopropylbiguanide. | 2-cyclopropylamino-4-(2-trifluoromethyl-4-chloroanilino)-1,3,5-triazine. |
| 1-(2-trifluoromethyl-4-bromophenyl)-5-t-butylbiguanide. | 2-t-butylamino-4-(2-trifluoromethyl-4-bromoanilino-1,3,5-triazine. |
| 1-(2-trifluoromethyl-4-nitrophenyl)-5-benzylbiguanide. | 2-benzylamino-4-(2-trifluoromethyl-4-nitroanilino)-1,3,5-triazine. |
| 1-(2-trifluoromethyl-4-iodophenyl)-5-methylbiguanide. | 2-methylamino-4-(2-trifluoromethyl-4-iodoanilino)-1,3,5-triazine. |
| 1-(3-trifluoromethyl-4-fluorophenyl)-5-ethylbiguanide. | 2-ethylamino-4-(3-trifluoromethyl-4-fluoroanilino)-1,3,5-triazine. |
| 1-(3-trifluoromethyl-4-bromophenyl)-5-pentylbiguanide. | 2-pentylamino-4-(3-trifluoromethyl-4-bromoanilino)-1,3,5-triazine. |
| 1-(3-trifluoromethyl-4-chlorophenyl)-5-ethylbiguanide. | 2-ethylamino-4-(3-trifluoromethyl-4-chloroanilino)-1,3,5-triazine. |
| 1-(4-trifluoromethyl-2-fluorophenyl)-5-methylbiguanide. | 2-methylamino-4-(4-trifluoromethyl-2-fluoroanilino)-1,3,5-triazine. |
| 1-(4-trifluoromethyl-2-chlorophenyl)-5-methylbiguanide. | 2-methylamino-4-(4-trifluoromethyl-2-chloroanilino)-1,3,5-triazine. |
| 1-(4-trifluoromethyl-2-bromophenyl)-5-cyclopropylbiguanide. | 2-cyclopropylamino-4-(4-trifluoromethyl-2-bromoanilino)-1,3,5-triazine. |
| 1-(4-trifluoromethyl-2-nitrophenyl)-5-methylbiguanide. | 2-methylamino-4-(4-trifluoromethyl-2-nitroanilino)-1,3,5-triazine. |
| 1-(4-trifluoromethyl-3-fluorophenyl)-5-ethylbiguanide. | 2-ethylamino-4-(4-trifluoromethyl-3-fluoroanilino)-1,3,5-triazine. |
| 1-(4-trifluoromethyl-3-chlorophenyl)-5-methylbiguanide. | 2-methylamino-4-(4-trifluoromethyl-3-chloroanilino)-1,3,5-triazine. |
| 1-(4-trifluoromethyl-3-bromophenyl)-5-ethylbiguanide. | 2-ethylamino-4-(4-trifluoromethyl-3-bromoanilino)-1,3,5-triazine. |
| 1-(2-fluoro-5-trifluoromethylphenyl)-5-allylbiguanide. | 2-allylamino-4-(2-fluoro-5-trifluoromethylanilino)-1,3,5-triazine. |
| 1-(2-chloro-5-trifluoromethylphenyl)-5-(4-pentenyl)biguanide. | 2-(4-pentenylamino)-4-(2-chloro-5-trifluoromethylanilino)-1,3,5-triazine. |
| 1-(2-trifluoromethyl-3-fluorophenyl)-5-ethylbiguanide. | 2-ethylamino-4-(2-trifluoromethyl-3-fluoroanilino)-1,3,5-triazine. |
| 1-(2-fluoro-4-chlorophenyl)-5-propylbiguanide. | 2-propylamino-4-(2-fluoro-4-chloroanilino)-1,3,5-triazine. |
| 1-(2-chloro-4-fluorophenyl)-5-pentylbiguanide. | 2-pentylamino-4-(2-chloro-4-fluoroanilino)-1,3,5-triazine. |
| 1-(2-chloro-6-fluorophenyl)-5-ethylbiguanide. | 2-ethyamino-4-(2-chloro-6-fluoroanilino)-1,3,5-triazine. |
| 1-(2,3-dibromophenyl)-5-methylbiguanide. | 2-methylamino-4-(2,3-dibromoanilino)-1,3,5-triazine. |
| 1-(2,5-dibromophenyl)-5-methylbiguanide. | 2-methylamino-4-(2,5-dibromoanilino)-1,3,5-triazine. |
| 1-(2,6-dibromophenyl)-5-methylbiguanide. | 2-methylamino-4-(2,6-dibromoanilino)-1,3,5-triazine. |
| 1-(2,3-dichlorophenyl)-5-methylbiguanide. | 2-methylamino-4-(2,3-dichloroanilino)-1,3,5-triazine. |
| 1-(2,6-dichlorophenyl)-5-methylbiguanide. | 2-methylamino-4-(2,6-dichloroanilino)-1,3,5-triazine. |
| 1-(2,4,6-trichlorophenyl)-5-ethylbiguanide. | 2-ethylamino-4-(2,4,6-trichloroanilino)-1,3,5-triazine. |
| 1-(2,3,5,6-tetrafluorophenyl)-5-ethylbiguanide. | 2-ethylamino-4-(2,3,5,6-tetrafluoroanilino)-1,3,5-triazine. |
| 1-(2,3,4,5,6-pentafluorophenyl)-5-ethylbiguanide. | 2-ethylamino-4-(2,3,4,5,6-pentafluoroanilino)-1,3,5-triazine. |
| 1-(2,6-dichloro-4-bromophenyl)-5-ethylbiguanide. | 2-ethylamino-4-(2,6-dichloro-4-bromoanilino)-1,3,5-triazine. |
| 1-(2,6-dichloro-4-fluorophenyl)-5-ethylbiguanide. | 2-ethylamino-4-(2,6-dichloro-4-fluoroanilino)-1,3,5-triazine. |
| 1-(2,6-dichloro-4-iodophenyl)-5-ethylbiguanide. | 2-ethylamino-4-(2,6-dichloro-4-iodoanilino)-1,3,5-triazine. |
| 1-(2,6-dichloro-4-nitrophenyl)-5-ethylbiguanide. | 2-ethylamino-4-(2,6-dichloro-4-nitroanilino)-1,3,5-triazine. |
| 1-(2,6-dichloro-4-trifluoromethylphenyl)-5-ethylbiguanide. | 2-ethylamino-4-(2,6-dichloro-4-trifluoromethylanilino)-1,3,5-triazine. |
| 1-(2,4-dichloro-6-bromophenyl)-5-ethylbiguanide. | 2-ethylamino-4-(2,4-dichloro-6-bromoanilino)-1,3,5-triazine. |
| 1-(2-trifluoromethyl-4-aminophenyl)-5-ethylbiguanide. | 2-ethylamino-4-(2-trifluoromethyl-4-aminoanilino)-1,3,5-triazine. |
| 1-(2-trifluoromethyl-4-acetylaminophenyl)-5-methylbiguanide. | 2-methylamino-4-(2-trifluoromethyl-4-acetylaminoanilino)-1,3,5-triazine. |
| 1-(2-bromo-4-methylphenyl)-5-ethylbiguanide. | 2-ethylamino-4-(2-bromo-4-methylanilino)-1,3,5-triazine. |
| 1-(2,6-dichloro-4-methylphenyl)-5-ethylbiguanide. | 2-ethylamino-4-(2,6-dichloro-4-methylanilino)-1,3,5-triazine. |
| 1-(2,4-dichloro-4-methylphenyl)-5-ethylbiguanide. | 2-ethylamino-4-(2,4-dichloro-4-methylanilino)-1,3,5-triazine. |
| 1-(2,5-dichloro-3-methylphenyl)-5-ethylbiguanide. | 2-ethylamino-4-(2,5-dichloro-3-methylanilino)-1,3,5-triazine. |
| 1-(2-iodo-4-methyl-6-chlorophenyl)-5-ethylbiguanide. | 2-ethylamino-4-(2-iodo-4-methyl-6-chloroanilino)-1,3,5-triazine. |
| 1-(2-chloro-4-bromo-6-fluorophenyl)-5-ethylbiguanide. | 2-ethylamino-4-(2-chloro-4-bromo-6-fluoroanilino)-1,3,5-triazine. |

EXAMPLE 3

1-(p-trifluoromethylphenyl)-5-cyclohexylbiguanide hydrochloride

A mixture of 22.8 g. (0.1 mole) of 1-(p-trifluoromethylphenyl)-3-cyanoguanidine in 100 ml. of m-cresol is heated with 13.6 g. (0.1 mole) of cyclohexylamine hydrochloride at 90° C. with stirring for 4 hours. The reaction mixture is then cooled, diluted with 1 l. of ether and worked thrice with 20% sodium hydroxide solution and then brine. The ether layer evaporated and the residue dissolved in methanol and acidified to pH 7.1 with methanolic hydrochloric acid solution. This is then evaporated to dryness and the residue is triturated with ether to give 1-(p-trifluoromethylphenyl)-5-cyclohexylbiguanide hydrochloride (M.P. 255–256° C.).

When 1-(p-trifluoromethylphenyl)-3-cyanoguanidine is replaced by an equimolar amount of the guanidines of Table I, below, and when cyclohexylamine hydrochloride is replaced by an equimolar amount of the amines of Table II, below, then the corresponding 1,5-disubstituted products are obtained.

TABLE I 1-(o-chlorophenyl)-3-cyanoguanidine
1-(m-chlorophenyl)-3-cyanoguanidine
1-(p-chlorophenyl)-3-cyanoguanidine
1-(2,3-dichlorophenyl)-3-cyanoguanidine
1-(2,4-dichlorophenyl)-3-cyanoguanidine
1-(2,5-dichlorophenyl)-3-cyanoguanidine
1-(2,6-dichlorophenyl)-3-cyanoguanidine 1-(3,4-dichlorophenyl)-3-cyanoguanidine
1-(3,5-dichlorophenyl)-3-cyanoguanidine
1-(2,3,4-trichlorophenyl)-3-cyanoguanidine
1-(2,3,5-trichlorophenyl)-3-cyanoguanidine
1-(2,3,6-trichlorophenyl)-3-cyanoguanidine
1-(2,4,5-trichlorophenyl)-3-cyanoguanidine
1-(2,4,6-trichlorophenyl)-3-cyanoguanidine
1-(3,4,5-trichlorophenyl)-3-cyanoguanidine
1-(p-trifluoromethoxyphenyl)-3-cyanoguanidine
1-(p-iodophenyl)-3-cyanoguanidine
1-(p-methoxyphenyl)-3-cyanoguanidine
1-(p-cyanophenyl)-3-cyanoguanidine
1-(p-ditrifluoromethylsulfonamidophenyl)-3-cyanoguanidine
1-(p-trifluoromethylsulfonylphenyl)-3-cyanoguanidine
1-(p-trifluoroacetylphenyl)-3-cyanoguanidine
1-(p-dimethylsulfonamidophenyl)-3-cyanoguanidine
1-(2,4-difluorophenyl)-3-cyanoguanidine
1-(2-trifluoromethyl-4-fluorophenyl)-3-cyanoguanidine
1-(2-trifluoromethyl-4-chlorophenyl)-3-cyanoguanidine
1-(2-trifluoromethyl-4-bromophenyl)-3-cyanoguanidine
1-(3-trifluoromethyl-4-fluorophenyl)-3-cyanoguanidine
1-(3-trifluoromethyl-4-chlorophenyl)-3-cyanoguanidine
1-(3-trifluoromethyl-4-bromophenyl)-3-cyanoguanidine
1-(4-trifluoromethyl-2-fluorophenyl)-3-cyanoguanidine
1-(4-trifluoromethyl-2-chlorophenyl)-3-cyanoguanidine
1-(4-trifluoromethyl-2-bromophenyl)-3-cyanoguanidine
1-(2-bromo-4-methylphenyl)-3-cyanoguanidine
1-(2,6-dichloro-4-methylphenyl)-3-cyanoguanidine
1-(2-chloro-4-methylphenyl)-3-cyanoguanidine
1-(2-chloro-4-nitrophenyl)-3-cyanoguanidine

TABLE II

| methylamine | ethylamine |
| propylamine | i-propylamine |
| t-butylamine | pentylamine |
| allylamine | methallylamine |
| 4-pentenylamine | cyclopropylamine |
| cyclobutylamine | benzylamine |
| phenethylamine | |

When the above reaction is carried out in a phenol or xylol the same product is prepared.

The above are detailed examples which show the preparation of the compounds of this invention. They are to be construed as illustrations of said compounds and not as limitations thereof.

We claim:
1. A compound of the formula

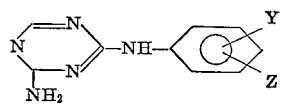

where Y is fluoro and Z is trifluoromethyl.

2. A compound according to claim 1 where Y is 4-fluoro and Z is 2-trifluoromethyl thus forming 2-amino-4-(2-trifluoromethyl-4-fluoroanilino)-1,3,5-triazine.

3. A compound according to claim 1 where Y is 4-fluoro and Z is 3-trifluoromethyl thus forming 2-amino-4-(3-trifluoromethyl-4-fluoroanilino)-1,3,5-triazine.

4. A compound according to claim 1 where Y is 2-fluoro and Z is 4-trifluoromethyl thus forming 2-amino-4-(2-fluoro-4-trifluoromethylanilino)-1,3,5-triazine.

5. A compound according to claim 1 where Y is 3-fluoro and Z is 4-trifluoromethyl thus forming 2-amino-4-(3-fluoro-4-trifluoromethylanilino)-1,3,5-triazine.

6. A compound according to claim 1 where Y is 2-fluoro and Z is 5-trifluoromethyl thus forming 2-amino-4-(2-fluoro-5-trifluoromethylanilino)-1,3,5-triazine.

7. A compound of the formula

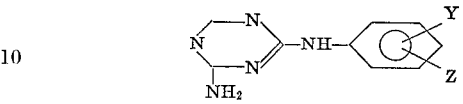

where Y is chloro and Z is trifluoromethyl.

8. A compound according to claim 7 where Y is 4-chloro and Z is 2-trifluoromethyl thus forming 2-amino-4-(2-trifluoromethyl-4-chloroanilino)-1,3,5-triazine.

9. A compound according to claim 7 where: Y is 4-chloro and Z is 3-trifluoromethyl thus forming 2-amino-4-(3-trifluoromethyl-4-chloroanilino)-1,3,5-triazine.

10. A compound according to claim 7 where: Y is 2-chloro and Z is 4-trifluoromethyl thus forming 2-amino-4-(2-chloro-4-trifluoromethylanilino)-1,3,5-triazine.

11. A compound according to claim 7 where: Y is 3-chloro and Z is 4-trifluoromethyl thus forming 2-amino-4-(3-chloro-4-trifluoromethylanilino)-1,3,5-triazine.

12. A compound according to claim 7 where: Y is 2-chloro and Z is 5-trifluoromethyl thus forming 2-amino-4-(2-chloro-5-trifluoromethylanilino)-1,3,5-triazine.

13. A compound of the formula

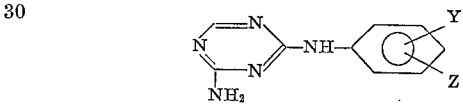

where Y is bromo and Z is trifluoromethyl.

14. A compound according to claim 13 where: Y is 4-bromo and Z is 2-trifluoromethyl thus forming 2-amino-4-(2-trifluoromethyl-4-bromoanilino)-1,3,5-triazine.

15. A compound according to claim 13 where: Y is 4-bromo and Z is 3-trifluoromethyl thus forming 2-amino-4-(3-trifluoromethyl-4-bromoanilino)-1,3,5-triazine.

16. A compound according to claim 13 where: Y is 2-bromo and Z is 4-trifluoromethyl thus forming 2-amino-4-(2-bromo-4-trifluoromethylanilino)-1,3,5-triazine.

17. A compound according to claim 13 where: Y is 3-bromo and Z is 4-trifluoromethyl thus forming 2-amino-4-(3-bromo-4-trifluoromethylanilino)-1,3,5-triazine.

18. A compound according to claim 13 where: Y is 2-bromo and Z is 5-trifluoromethyl thus forming 2-amino-4-(2-bromo-5-trifluoromethylanilino)-1,3,5-triazine.

19. A compound of the formula

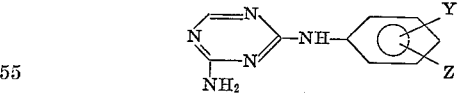

where Y is trifluoromethyl and Z is trifluoromethyl.

20. A compound according to claim 19 where: Y is 3-trifluoromethyl and Z is 5-trifluoromethyl thus forming 2-amino-4-(3,5-ditrifluoromethylanilino)-1,3,5-triazine.

21. A compound of the formula

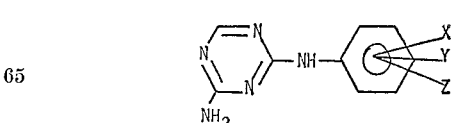

where X is chloro, Y is fluoro and Z is trifluoromethyl.

22. A compound of the formula

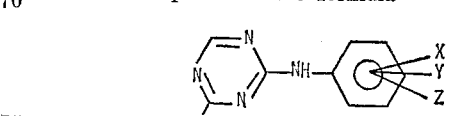

where X is chloro, Y is chloro and Z is trifluoromethyl.

23. A compound of the formula

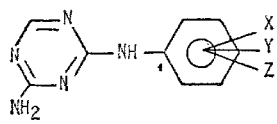

where X is chloro, Y is bromo and Z is trifluoromethyl.

24. A compound of the formula

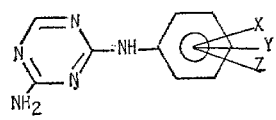

where X is chloro, Y is trifluoromethyl and Z is trifluoromethyl.

25. A compound of the formula

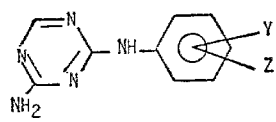

where Y is fluoro and Z is fluoro.

26. A compound according to claim 25 where: Y is 2-fluoro and Z is 4-fluoro thus forming 2-amino-4-(2,4-difluoroanilino)-1,3,5-triazine.

27. A compound according to claim 25 where: Y is 2-fluoro and Z is 5-fluoro thus forming 2-amino-4-(2,5-difluoroanilino)-1,3,5-triazine.

28. A compound according to claim 25 where: Y is 3-fluoro and Z is 5-fluoro thus forming 2-amino-4-(3,5-difluoroanilino)-1,3,5-triazine.

29. A compound of the formula

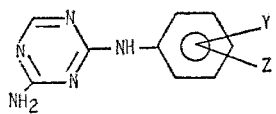

where Y is chloro and Z is fluoro.

30. A compound according to claim 29 where: Y is 2-chloro and Z is 4-fluoro thus forming 2-amino-4-(2-chloro-4-fluoroanilino)-1,3,5-triazine.

31. A compound according to claim 29 where: Y is 4-chloro and Z is 2-fluoro thus forming 2-amino-4-(2-fluoro-4-chloroanilino)-1,3,5-triazine.

32. A compound according to claim 29 where: Y is 2-chloro and Z is 6-fluoro thus forming 2-amino-4-(2-fluoro-6-chloroanilino)-1,3,5-triazine.

33. A compound of the formula

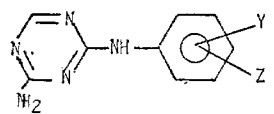

where Y is bromo and Z is fluoro.

34. A compound according to claim 33 where: Y is 2-bromo and Z is 4-fluoro thus forming 2-amino-4-(2-bromo-4-fluoroanilino)-1,3,5-triazine.

35. A compound according to claim 33 where: Y is 4-bromo and Z is 2-fluoro thus forming 2-amino-4-(2-fluoro-4-bromoanilino)-1,3,5-triazine.

36. A compound according to claim 33 where: Y is 2-bromo and Z is 6-fluoro thus forming 2-amino-4-(2-bromo-6-fluoroanilino)-1,3,5-triazine.

37. A compound of the formula

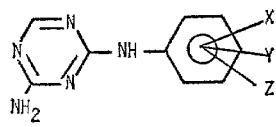

where X is chloro, Y is fluoro and Z is fluoro.

38. A compound of the formula

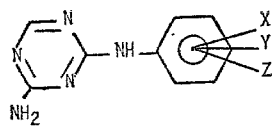

where X is chloro, Y is chloro and Z is fluoro.

39. A compound of the formula

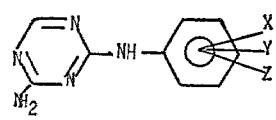

where X is chloro, Y is bromo and Z is fluoro.

40. A compound of the formula

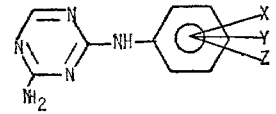

where X is chloro, Y is chloro and Z is chloro.

41. A compound according to claim 40 where: X is 2-chloro, Y is 4-chloro and Z is 5-chloro thus forming 2-amino-4-(2,4,5-trichloroanilino)-1,3,5-triazine.

42. A compound according to claim 40 where: X is 2-chloro, Y is 4-chloro and Z is 6-chloro thus forming 2-amino-4-(2,4,6-trichloroaniline)-1,3,5-triazine.

43. A compound of the formula

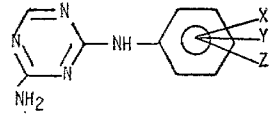

where X is chloro, Y is bromo and Z is chloro.

44. A compound according to claim 43 where: X is 2-chloro, Y is 4-bromo and Z is 6-chloro thus forming 2-amino-4-(2,6-dichloro-4-bromoanilino)-1,3,5-triazine.

45. A compound according to claim 43 where: X is 2-chloro, Y is 6-bromo and Z is 4-chloro thus forming 2-amino-4-(2,4-dichloro-6-bromoanilino)-1,3,5-triazine.

46. 2-amino-4-(2,6-dichloroanilino)-1,3,5-triazine.

47. 2-amino-4-(2-bromo-6-chloroanilino)-1,3,5-triazine.

48. 2-amino-4-(2,3,5,6-tetrafluoroanilino) - 1,3,5 - triazine.

49. 2 - amino-4-(2,3,4,5,6-pentafluoroanilino)-1,3,5-triazine.

References Cited
UNITED STATES PATENTS

| | | | |
|---|---|---|---|
| 2,320,882 | 6/1943 | Oldham | 260—249.9 X |
| 2,928,768 | 3/1960 | Freedman et al. | 260—249.9 X |
| 3,146,229 | 8/1964 | Cutler | 260—249.9 X |

JOHN M. FORD, Primary Examiner

U.S. Cl. X.R.

260—565; 424—249